US005166477A

United States Patent [19]

Perin, Jr. et al.

[11] Patent Number: 5,166,477

[45] Date of Patent: Nov. 24, 1992

[54] CABLE AND TERMINATION FOR HIGH VOLTAGE AND HIGH FREQUENCY APPLICATIONS

[75] Inventors: Joseph C. Perin, Jr.; John C. Scott, both of Cincinnati, Ohio

[73] Assignee: General Electric Company, Cincinnati, Ohio

[21] Appl. No.: 705,866

[22] Filed: May 28, 1991

[51] Int. Cl.[5] .......... H02G 15/02

[52] U.S. Cl. .......... 174/74 R; 174/75 D; 174/75 C; 174/75 F; 174/83; 174/113 C; 439/578; 439/583; 439/700; 439/739

[58] Field of Search .......... 174/74 R, 75 C, 75 D, 174/75 F, 83, 36, 113 C, 131 A; 439/578, 581, 583, 609, 700, 739

[56] References Cited

U.S. PATENT DOCUMENTS

| | | | |
|---|---|---|---|
| 355,611 | 1/1887 | Howson | 174/84 R |
| 2,302,839 | 11/1942 | Burgett | 174/27 |
| 2,325,549 | 7/1943 | Ryzowitz | 174/120 R |
| 2,870,420 | 1/1959 | Malek | 439/583 X |
| 2,890.263 | 6/1959 | Brandes et al. | 174/29 |
| 3,163,836 | 12/1964 | Sugi et al. | 333/96 |
| 3,309,455 | 3/1967 | Mildner | 174/29 |
| 3,348,186 | 10/1967 | Rosen | 338/214 |
| 3,453,376 | 7/1969 | Ziegler, Jr. et al. | 174/75 C |
| 3,686,623 | 8/1972 | Nijman | 439/581 X |
| 3,792,409 | 2/1974 | Smart et al. | 174/36 |
| 3,798,589 | 3/1974 | Deardurff | 174/74 R |
| 3,823,253 | 7/1974 | Walters et al. | 174/113 C |
| 3,886,301 | 5/1975 | Cronin et al. | 174/21 C |
| 4,090,028 | 5/1978 | Vontobel | 174/14 R |
| 4,145,567 | 3/1979 | Bahder et al. | 174/107 |
| 4,470,657 | 9/1984 | Deacon | 439/609 |
| 4,585,289 | 4/1986 | Bocher | 439/312 |
| 4,755,152 | 7/1988 | Elliot et al. | 174/75 C X |
| 4,757,297 | 7/1988 | Frawley | 174/36 |
| 4,816,611 | 3/1989 | Invernizzi | 174/131 A X |
| 4,894,490 | 1/1990 | Fujimoto | 174/108 |

FOREIGN PATENT DOCUMENTS

| | | | |
|---|---|---|---|
| 963860 | 3/1948 | France . | |
| 1011930 | 4/1949 | France . | |
| 2057789 | 4/1981 | United Kingdom | 439/609 |

OTHER PUBLICATIONS

148 USPQ Publication *In re Griver,* pp. 197–203.

*Primary Examiner*—Morris H. Nimmo
*Attorney, Agent, or Firm*—Jerome C. Squillaro; Bernard E. Shay

[57] ABSTRACT

A cable and termination for high voltage and high frequency current carrying applications includes an inner conductor having a sheath of braided metallic wire and a cylindrical core of flexible material extending within the sheath and supporting the sheath to prevent reduction in diameter of the sheath in response to tensile forces applied to the cable. The core includes one or more wire filaments connected to bear a portion of tensile forces applied to the cable. The inner conductor is encased in an outer insulation assembly which includes a conducting layer, spaced from the sheath and connected for ground return. The cable includes a termination assembly having a socket, connected to the sheath and wire filaments, for receiving an inner conductor of a complementary termination assembly. The socket includes a shank portion for receiving the pin of a complimentary termination assembly and which is fitted within the outer insulation assembly, and a bell portion which abuts the outer insulation assembly and is attached to the metallic wire sheath.

14 Claims, 1 Drawing Sheet

CABLE AND TERMINATION FOR HIGH VOLTAGE AND HIGH FREQUENCY APPLICATIONS

BACKGROUND OF THE INVENTION

The present invention relates to coaxial cable and termination assemblies and, more particularly, to cable and termination assemblies for high voltage and high frequency applications.

A coaxial cable is a necessary and common component of the ignition systems of internal combustion engines, including gas turbine engines, used in aircraft, marine and automotive applications, as well as radar and laser power supply applications. In some applications, the cable is used to conduct high voltage and high frequency current for short durations typically 10–200 microseconds, in hostile environments which provide extreme temperatures and corrosive elements. Such voltages can be from 20,000 to 50,000 volts at frequencies exceeding 1 megahertz.

A typical coaxial cable used in such an application includes a stranded wire core, a covering of dielectric material such as a silicone or fluorosilicone a fiber glass braid covering the dielectric layer and an outer jacket of rubber or silicone. In some existing designs, the outer layers include an outer conductor of a metallic wire braid which is connected as a ground return. When the stranded central conductor transmits high frequency current, the voltage induced inside the conductor which opposes the applied voltage becomes sufficiently large to force the current to distribute itself so that the greater proportion flows near the surface of the conductor and less near the center. This phenomenon is known as "skin effect."

While negligible at low frequencies, skin effect increases with increasing frequency to such a degree that at high frequencies the major portion of the current flows near the surface. So little current flows in the interior of the conductor at these high frequencies that the utilized portion of the conductor is in the shape of a thin tube. Since such a small portion of the conductor is used the resistance per unit length of the conductor increases.

One attempt to design a coaxial cable which compensates for skin effect is disclosed in Sugi et. al. U.S. Pat. No. 3,163,836. That patent discloses high frequency electric conductors in which the wires constituting the cable are arranged in layers insulated one from another and comprise one or more elemental wires or tapes, the pitch of the wires or tapes in the respective layers being chosen so as to minimize the skin effect. The layers are stranded about a central core of plastic insulating material. While such a design may effectively transmit high frequency current, a disadvantage is that its fabrication cost is relatively high since multiple layers of conductor material are required to be stranded about a central core.

Accordingly, there is a need for a high voltage high-frequency cable which possesses increased efficiency over comparably sized prior art cable designs, yet is relatively inexpensive to manufacture.

SUMMARY OF THE INVENTION

The present invention is a cable and termination for high voltage and high frequency applications which includes an inner conductor having a sheath of braided metallic wire enclosing a cylindrical core of a flexible, non-conducting material. The braided sheath possesses high conductivity characteristics in high frequency and high voltage applications yet is relatively low cost and flexible. The braided sheath provides a large surface area, which reduces energy losses in the transmission of high frequency impulses yet maintains a favorable size to weight ratio of the cable. The inner cylindrical core prevents the braided sheath from contracting in diameter, thereby reducing conductivity, in response to bending or to tensile loads which may be imposed upon the cable, such as during connection with or disconnection from electrical components and cable.

In a preferred embodiment, the cylindrical core includes at least one and preferably as many as four wire filaments which extend longitudinally through the core. While such filaments do not conduct appreciable amounts of current, they bear tensile loads imposed on the cable. The preferred embodiment also includes a termination assembly having a socket connected to the sheath for receiving a complementary termination assembly. The socket component includes a cylindrical shank which is connected to the wire filaments and is encased in the dielectric layer of the cable, and a bell portion which abuts the dielectric layer and is connected to the braided sheath. Consequently, the termination assembly utilizes the insulation layers of the cable, thereby eliminating additional insulation layers commonly employed in prior art termination assemblies.

Accordingly, it is an object of the present invention to provide a cable and termination for high voltage and high frequency applications which utilizes a braided cylindrical wire conductor encasing a nonconducting core for conducting current and bearing a portion of the tensile stresses imposed on the cable; a cable and termination in which a central, nonconducting core includes wire filaments connected to the termination assembly for bearing tensile loads imposed on the cable during connection and disconnection of the termination assembly, a cable and termination in which the termination assembly utilizes the cable insulation layers for the male termination insulator component, thereby eliminating additional and different insulation components; and a cable and termination which is relatively inexpensive to manufacture, is resistant to hostile environments and adequately protects against premature degradation from coronal discharges.

Other objects and advantages of the present invention will be apparent from the following description, the accompanying drawings and the appended claims.

DETAILED DESCRIPTION

Figure 1:
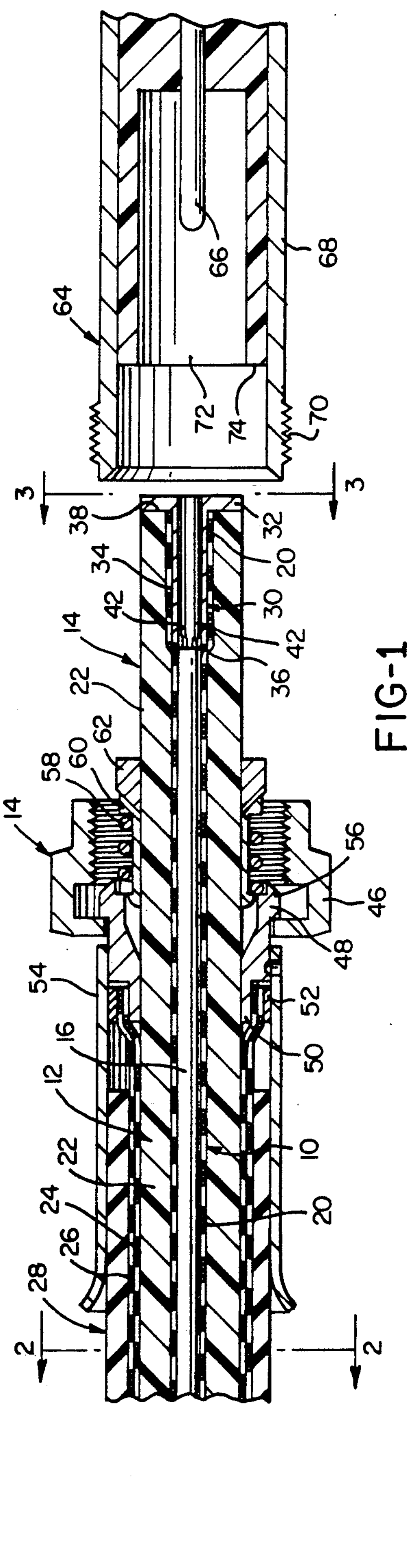
FIG. 1 is a side elevation in section of a preferred embodiment of the cable and termination of the present invention shown adjacent to a male connector.
Figure 2:
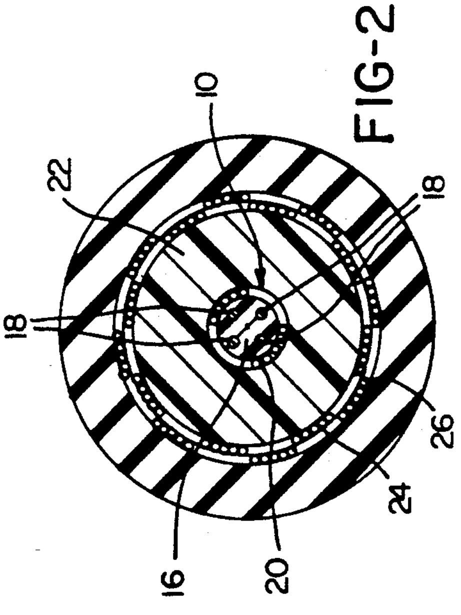
FIG. 2 is a cross-section taken at line 2—2 of FIG. 1.

As shown in FIGS. 1 and 2, the cable and termination of the present invention includes an inner conductor, generally designated 10, an outer insulation assembly 12 and a termination assembly 14. The inner conductor 10 includes a central cylindrical core 16 made of a nonconducting material such as polytetrafluoroethylene or nylon. One or more wire filaments 18 made of solid metal such as nickel or stainless steel extend through the core. A tubular, preferably cylindrical braided wire sheath 20 extends about the core 16 and is made of nickel plated copper wire.

The outer insulation assembly 12 includes a layer 22 of dielectric material such as silicone or fluorosilicone which extends the length of the cable. Double layers 24, 26 of a shield, such as braided nickel plated copper, enclose the dielectric layer 22 and are connected to ground. An outer layer 28 is a jacket of rubber.

Figure 3:
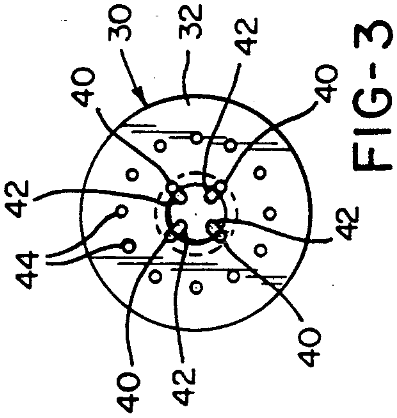
FIG. 3 is an end elevation of the cable and termination taken at line 3—3 of FIG. 1.

As shown in FIGS. 1 and 3, the termination assembly 14 includes a socket 30, preferably made of gold-plated copper, having a bell portion 32 and a cylindrical shank 34, which defines a socket cavity. The shank 34 is inserted within the dielectric layer 22 and includes an inner end 36 which abuts the core 16. The outer end 38 of the dielectric 22 abuts the inner surface of the bell 32.

As best shown in FIG. 3, the shank 34 includes longitudinally extending grooves 40 which are positioned adjacent the bell 32 and are shaped to receive protruding ends 42 of the wire filaments 18. The bell 32 includes a plurality of orifices 44 which are spaced in a generally circular pattern about the periphery of the bell, and receive the ends of the braided wires comprising the sheath 20. The wire filaments 18 and wires of the braided sheath 20 are retained within the grooves 40 and orifices 44, respectively, by well known means such as electron beam or laser welding. The grooves 40 are shaped so that the wire filaments 18 form a flush fit with the inner surface of the shank 34.

As shown in FIG. 1, the termination assembly 14 also includes a threaded connector comprising a nut 46 captured on a ferrule 48. The ferrule includes a circumferential flange 50 which is inserted beneath the ends of the shield layers 24, 26 and is secured thereto by a crimp ring 52. The ferrule 48 is enclosed partially by a cylindrical metal strain relief 54. The nut 46 is captured on the ferrule 48 by a shoulder 56. A coil spring 58 is contained between the ferrule 48 and captivating bushing 60. An annular insulating seal 62, preferably made of a nonconducting material such as fluorosilicone, is positioned adjacent to the bushing 60.

In a preferred embodiment shown in the figures, the termination assembly is designed to receive the female connector 64 of a standard ARP 670 Type 3F termination. This termination includes a central pin 66, an outer sleeve 68 having a threaded section 70 and an inner insulating sleeve 72 forming a shoulder 74. The interior of the shank 34 is shaped to receive the pin 66 in a slight interference fit of controlled mating force. The inner diameter of the insulating sleeve 72 is sized to receive the dielectric layer 22. Accordingly, when the connector 64 is attached to the termination assembly 14, the insulator seal 62 abuts the shoulder 74, thereby compressing the spring 58 to provide compression on the connection, and the nut 46 is threaded on the threads 70.

Consequently, the present invention possesses advantages over the prior art in that the inner conductor is a flexible wire cylindrical braid which, as a result of the skin effect, positions conductor material where it is fully utilized. Further, tensile forces exerted on the cable during use, as well as during connection and separation of the termination assemblies 14, 64, are borne only partially by the braided wire sheath 20. The diameter of the sheath 20 is not reduced when the cable is placed under tension since it is maintained in shape by the inner core 16 which is substantially incompressible, yet flexible. Tensile forces are also borne by the wire filaments 18 which are attached to the socket 30.

With regard to the termination 14, it requires only the same dielectric layer 22 as the remainder of the cable in order to maintain the requisite dielectric strength. The cable and termination assembly of the present invention possesses a high efficiency in transmitting energy, when compared to prior art devices.

The manufacturing process used to terminate the cable includes the following steps. The outer jacket 28 is stripped back an appropriate amount to provide clearance for the termination assembly 14. The outer conductor and shielding layers 24, 26 are also cut back appropriately and crimped onto the ferrule 48 by crimp ring 52. The dielectric layer 22 is removed sufficiently to expose approximately 0.10 inches of wire filaments 18. The core material 16 is removed to a depth of approximately 0.50 inches, thereby creating a hollow cylindrical cavity within the sheath 20 and dielectric 22. The socket 30 is inserted into the cavity and wires 19 are joined to the grooves 40 by electron beam or laser welding. The wires of sheath 20 are mounted in the orifices 44 also by electron beam or laser welding. Strain relief 54 and nut 46 are then added, and the strain relief is attached to the ferrule 48 by plug welds. Finally, captivated bushing 60 and spring 58 are slid over the dielectric 22, as is seal 62.

It should be noted that, in order for the cable and termination assembly of the present invention to function satisfactorily in existing systems, the lead must be constructed such that the dielectric strength of the dielectric layer 22 is not exceeded by application of a potential difference of 26 KVDC between the inner conductor sheath 20 and outer conductor shield element 24 or outer conductor. The material properties of dielectric layer 22 and cable geometry must be such that:

$$26\ KVDC = (\text{dielectric strength}) \times r_i ln\ (r_o/r_i)$$

where are $r_i$ is the outer radius of the inner conductor 20 and $r_o$ is the inner radius of the outer conductor 24.

The voltage levels stated above may be higher or lower, depending on the application, which will in turn affect the radial and diametral dimensions. The dimensions stated by the referenced standard ARP670 (Society of Automotive Engineers) may also be changed for requirements of a specific application.

While the form of apparatus herein described constitutes a preferred embodiment of this invention, it is to be understood that the invention is not limited to this precise form of apparatus, and that changes may be made therein without departing from the scope of the invention.

What is claimed is:

1. A cable and termination for high voltage and high frequency current carrying applications comprising:
   - an inner conductor including a tubular sheath of braided metallic wire and a cylindrical core of flexible material extending within said sheath and supporting said sheath to prevent reduction in diameter thereof in response to bending and tensile forces applied to said cable;
   - an outer insulation assembly enclosing said inner conductor and including a conducting layer, spaced from said sheath; and a termination assembly including socket means, connected to said sheath, for receiving an inner conductor of a complementary termination assembly.

2. The cable and termination of claim 1 wherein said inner conductor includes at least one wire filament extending through said cylindrical core and attached to said termination assembly, whereby tensile forces applied to said cable and termination are borne by said filament.

3. The cable and termination of claim 2 wherein said wire filament is attached to said socket means, whereby tensile forces exerted on said termination during connection and disconnection with said complementary termination assembly are borne by said wire filament.

4. The cable and termination of claim 1 wherein said cylindrical core is made of a nonconducting material.

5. The cable and termination of claim 4 wherein said cylindrical core is made of a nonconducting material selected from the group consisting of nylon and polytetrafluoroethylene.

6. The cable and termination of claim 2 wherein said inner conductor includes a plurality of wire filaments extending through said cylindrical core.

7. The cable and termination of claim 2 wherein said outer insulation assembly includes a dielectric layer spacing said conducting layer from said sheath.

8. The cable and termination of claim 7 wherein said socket means includes a bell portion and a cylindrical shank portion defining a socket cavity, said socket means being mounted in an end of said cable such that an inner end of said shank abuts said inner conductor and said shank is enclosed by said dielectric layer, and said dielectric layer abuts said bell portion and said sheath is attached to said bell portion.

9. The cable and termination of claim 8 wherein said shank includes longitudinal grooves in an inner periphery thereof receiving said wire filaments in a flush fit, whereby said inner periphery is of uniform diameter to receive a pin of said complementary termination assembly.

10. The cable and termination of claim 9 wherein said socket means is made of gold-plated copper.

11. The cable and termination of claim 10 wherein said bell portion includes a plurality of orifices spaced in a substantially circular pattern and receiving ends of said braided metallic wire of said sheath.

12. A cable and termination for high voltage and high frequency current carrying applications comprising:

an inner conductor including a cylindrical sheath of braided metallic wire, a cylindrical core of flexible, nonconducting material extruding within said sheath, and a plurality of metallic wire filaments extruding through said core;

an outer insulation assembly enclosing said inner conductor and including a dielectric layer enclosing said inner conductor, a shield layer enclosing said dielectric layer, and an outer jacket of a conducting material; and a termination assembly including socket means for receiving an inner conductor of a complementary termination assembly, said socket means including a shank extending within said dielectric layer and having an inner end abutting said inner conductor and including longitudinal grooves about an inner periphery thereof receiving said wire filaments in a flush fit, said bell portion abutting an end of said selectric layer and including a plurality of orifices spaced in substantially a circular pattern about said bell portion, said orifices receiving ends of said braided wires.

13. The cable and termination of claim 12 wherein said termination includes a ferrule extending about said dielectric layer and including a lip overlapped by said shield layer, a crimp ring clamping said shield layer against said lip, a nut rotatably captured on said ferrule, a cylindrical metallic strain relief fixed to and enclosing said outer jacket and crimp ring, an insulator seal slidably mounted on said dielectric and captured at an end thereof by said ferrule, and resilient means extending between said ferrule and said insulator seal.

14. A cable and termination having an inner conductor, an outer insulation assembly enclosing said inner conductor an including a conducting layer, spaced from said inner conductor and a termination assembly including socket means, connected to said inner conductor, for receiving an inner conductor of a complementary termination assembly, wherein the improvement comprises:

said inner conductor including a substantially cylindrical sheath of braided metallic wire and a cylindrical core of a flexible, nonconducting material extending within said sheath and supporting said sheath to prevent reduction in diameter thereof in response to tensile forces applied to said cable.

* * * * *